Oct. 9, 1956   L. F. BELDT   2,765,764
COMPOSITE INDICATOR MECHANISM
Filed March 23, 1954   2 Sheets-Sheet 1

INVENTOR.
LAUREN F. BELDT
BY
Moody and Ethington
ATTORNEYS

Oct. 9, 1956 L. F. BELDT 2,765,764
COMPOSITE INDICATOR MECHANISM
Filed March 23, 1954 2 Sheets-Sheet 2

INVENTOR.
LAUREN F. BELDT
BY
Moody and Ethington
ATTORNEYS

2,765,764
Patented Oct. 9, 1956

2,765,764

COMPOSITE INDICATOR MECHANISM

Lauren F. Beldt, Cedar Rapids, Iowa, assignor to Collins Radio Company, Cedar Rapids, Iowa, a corporation of Iowa Application March 23, 1954, Serial No. 418,131

5 Claims. (Cl. 116—124.1)

This invention relates to an indicator mechanism for presenting to an observer the magnitude of a measured quantity and more particularly to that type of indicator which presents a composite reading of the magnitude. In this type of indicator the first group of significant figures are presented on one scale and the remaining group of significant figures are presented on a second scale.

The composite type of indicator in which a fine scale presents subdivisions of the scale divisions of the coarse scale has numerous advantages including increased convenience of reading and accuracy in presentation. A disadvantage of the composite indicator is the large space requirement necessitated by the two scales, each of which has a separate drive train.

It is an object of this invention, therefore, to overcome the disadvantage of large space requirement while retaining the advantages of convenient reading and accurate presentation.

It is a further object of this invention to present a composite indicator which requires a minimum of panel frontage space for presentation.

A further object is to provide a composite scale indicator which divides the range of magnitudes to be measured into plural bands, the bands being of differing extent and being represented by scales which are arranged on the indicator for maximum utilization of the indicator space.

Additionally, it is an object of this invention to provide a composite indicator comprising the combination of a disk indicator and a drum indicator, the indicators being in superposed relation.

More particularly it is an object of this invention to provide a composite indicator including a disk and drum, each of which is provided with plural corresponding scales, the indicators being in superposed relation and provided with a single shutter for exposing corresponding scales.

These and other objects and advantages of the invention will become apparent from the detailed description which follows taken in connection with the accompanying drawings, in which.

Briefly, this invention resides in a provision of a disk and a drum in superposed relation as a composite indicator for presenting the measured magnitude of a given quantity. The disk indicator is provided with one or more circumferentially extending scales adjacent its periphery, each scale representing the extent of a band within the range of measurement. For each band on the disk indicator the scale divisions are subdivided and presented on a drum indicator which is positioned directly behind the disk. The drum is provided with plural circumferentially extending scales, each of which corresponds to one of the band scales on the disk. The drum scales are visible to an observer through a transparent central portion of the disk which lies within the disk scales. A shutter mechanism is provided to overlie the face of the disk which exposes to view only a selected one of the band scales and its corresponding drum scale. The disk and drum indicators are rotatably driven from a common input shaft through separate drive trains in a predetermined ratio of movement.

In the illustrative embodiment this invention is shown as applied to a frequency indicator for radio apparatus such as a receiver or transmitter. However, it is to be clearly understood that the invention is in no way limited to such application. It is applicable as a composite indicator for presenting the measured magnitude of any physical quantity.

Figure 1:
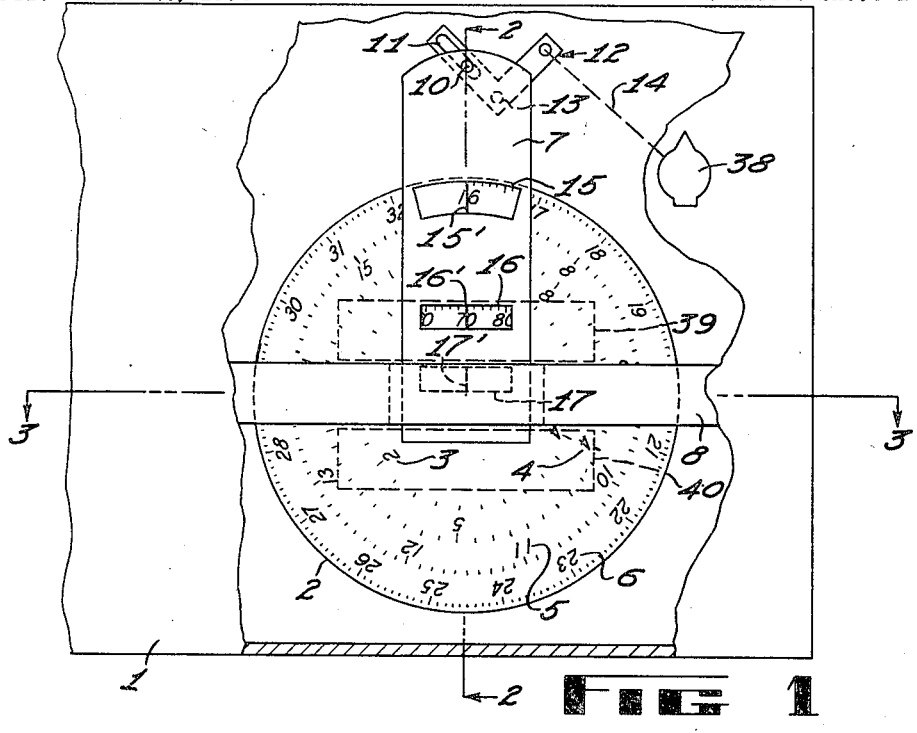
Figure 1 is a front elevational view of the composite indicator showing its relation to a mounting panel, part of which is removed to expose to view the actuating mechanisms.

Referring now to the drawings, in Figure 1 there is shown the face of the composite indicator as it appears to an observer. The indicator is mounted upon a panel 1 which may form a part of a radio cabinet. A circular disk 2 of transparent material such as a clear plastic, is provided on its surface with a plurality of band scales 3, 4, 5 and 6 which are radially spaced and extend circumferentially of the disk adjacent its periphery. Overlying the face of the disk is a shutter 7 which is slideably supported in a transverse plate 8. The plate 8 is secured by means not shown to the rear surface of the panel 1. On the rear surface of the plate 8 is provided a pair of flanges 9 and 9' which are formed to overlie the rear surface of the shutter 7 to serve as supporting guides for sliding motion of the shutter.

The shutter 7 is provided at its upper end with a pin 10 extending through a slot 11 in one arm of the bell crank 12. The bell crank is rotatably supported about the fixed pin 13. On the other arm of the bell crank 12 is secured a linkage mechanism 14 shown schematically which extends to a band selector switch 38 rotatably mounted on the front of the panel 1.

The shutter 7 is provided with a set of windows or openings 15, 16 and 17. The window 15 is of a arcuate shape and in the position shown exposes to view the scale divisions of band scale 6. This window is provided with an index mark 15'. The window 16 having index mark 16' exposes to view the drum scale which corresponds to band scale 3 in the position shown. The third window 17 with the index mark 17' is obscured from view in the position shown by the guide plate 8.

It will be apparent that by rotation of band selector switch 38 the linkage 14 causes rotation of the bell crank 12 and through the pin and slot connection causes the shutter 7 to slide vertically in the guides 9 and 9'. For the band scale arrangement illustrated, the band selector switch would have four positions which correspond to the positions of the band scales. In each position a selected one of the band scales will be exposed through the window 15. Also in each position either the window 16 or the window 17 exposes the corresponding drum scale.

The frequency reading presented in the illustration of Figure 1 is 16.0 megacycles read on the band scale plus 70 kilocycles read on the drum scale or the composite reading is 16,070 kilocycles. The manner in which the drum scales are arranged to subdivide the corresponding disk scale will be apparent from the description which follows.

Figures 2, 3:
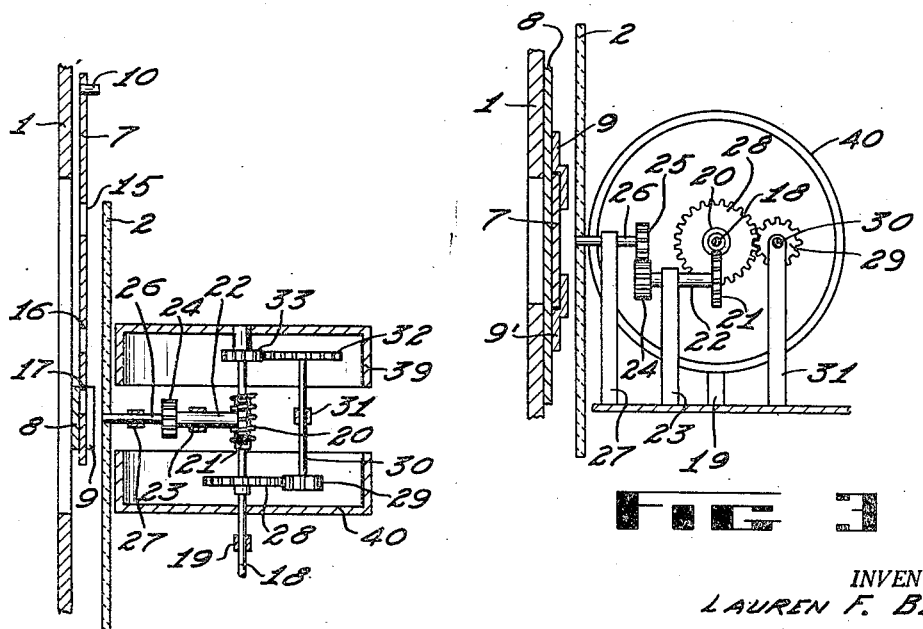
Figure 2 is a side elevational view taken on line 2—2 of Figure 1.
Figure 3 is a plan view taken on line 3—3 of Figure 1.

In Figures 2 and 3 are shown the supporting structure and the drive train for the drums or cylinders 39 and 40. The drum 40 is supported upon the driving shaft 18 which is suitably journaled in the bearing 19 indicated schematically for simplicity. An extension of shaft 18 supports the worm 20 and is rotatably received in a sleeve fixed to spur gear 33. A worm gear 21 meshes with the worm 20 and is mounted for rotation with a transversely extending shaft 22 which is suitably journaled in bearing 23. A spur gear 24 at the opposite end of shaft 22 is rotatable therewith and meshes with a spur gear 25. The spur gear 25 is keyed on a shaft 26 which is journaled for rotation in bearing 27. The disk 2 is mounted on the end of the shaft 26 for rotation therewith.

The spur gear 28 adjacent drum 40 is keyed for rotation with the driving shaft 18 and meshes with the spur gear 29 which is mounted on one end of countershaft 30. The countershaft 30 is journaled for rotation in the bearing 31 and carries on its opposite end the spur gear 32 which meshes with the spur gear 33 which in turn is non-rotatably secured to the drum 39.

By the drive trains just described the input shaft 18 rotatably drives the disk 2 through the gear reduction of the worm 20 and worm gear 21. The drum 40 is directly driven from the driving shaft 18. The drum 39 is driven through the step-up gear arrangement comprising spur gears 28 and 29, the countershaft 30 and the spur gears 32 and 33.

Referring back to Figure 1, it will be noted that in the exemplary embodiment, the total frequency range to be covered by the composite indicator extends from 2 megacycles to 32 megacycles. This range is divided into four bands represented by disk scales 3, 4, 5 and 6 and the bands illustrated are of unequal extent. Each of the band scales has a major scale division mark of one megacycle and minor scale division mark of one-tenth megacycle.

Figure 4:
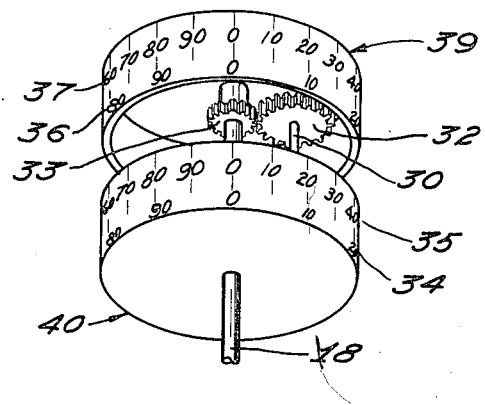
Figure 4 is a perspective view of the drum assembly.
Figure 5:
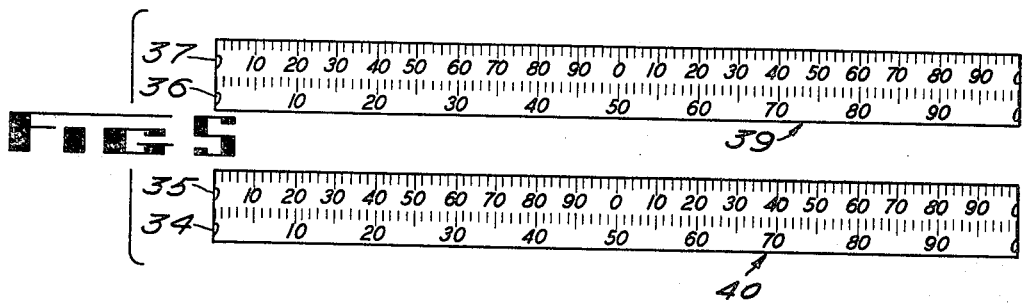
Figure 5 is a developed view of the scale divisions employed on the drum in the illustrative embodiment.

Corresponding to disk scale 3 which extends from 2.0 megacycles to 4.0 megacycles is drum scale 34 upon the surface of drum 40. Drum scale 34, as shown in Figures 4 and 5, extends from 0 to 100 kilocycles and thus subdivides into 1 major scale division the minor scale divisions of disk scale 3. This relation requires that for movement of disk scale 3 through one minor scale division the drum scale 34 must be moved through 1 major scale division. Since disk scale 3 has 20 minor scale divisions and drum scale 34 has 1 major scale division, the ratio of movement must be 1:20. This ratio is provided by the gear reduction of worm 20 and worm gear 21.

Disk scale 4 extends over a larger circumference than scale 3 and may conveniently cover a larger band of 4.0 to 8.0 megacycles. Corresponding to disk scale 4 is drum scale 35 adjacent drum scale 34 on drum 40. Drum scale 35 subdivides into 1 major scale division the minor scale divisions of disk scale 4. Since disk scale 4 has 40 minor scale divisions and drum scale 35 has 2 major scale divisions, the ratio of movement required is 1:20 as provided by the gear reduction drive through worm 20 and worm gear 21. In Figure 5 is shown scale 35 having 2 major scale divisions provided by the repeated scales 0 to 100 kilocycles.

The scales on drum 40 which are moved at the same rate form a first set of drum scales. The corresponding disk scales 3 and 4 comprise a corresponding set of disk scales.

A second set of disk scales 6 and 7 are provided to cover the ranges 8.0 to 16.0 and 16.0 to 32.0 megacycles respectively. A corresponding set of drum scales 36 and 37 are provided on drum 39. Since disk scale 5 has 80 minor scale divisions and drum scale 36 has 1 major scale division, a ratio of movement of 1:80 is required. For disk scale 6 there are 160 minor scale divisions and for the corresponding drum scale 37 there are 2 major scale divisions and the ratio of movement required is also 1:80. This ratio between the movement of disk 2 and drum 39 is provided by the gear reduction of worm 20 and worm gear 21 and the gear step-up drive through gears 28 and 29, countershaft 30 and gears 32 and 33.

It will be appreciated that the composite indicator may be provided with any suitable number of bands into which the range to be measured is divided. By the specific example given, the drum scales and the gear ratios of the drive trains may be suitably determined for any particular application.

In operation of the mechanism, when it is desired to measure in the first band represented by scale 3 the band selector switch is positioned accordingly and the shutter mechanism is moved downwardly from the position shown such that the window 17 exposes to view the drum scale 34. The input shaft 18 is then driven by a tuning mechanism of the apparatus with which the indicator is associated and the frequency is presented to an observer through the window 15 on disk scale 3 and through window 17 on drum indicator 34. It will be seen that the window 17 may be positioned to expose either of the drum scales 34 or 35 according to the position of band selector switch 38 and likewise the window 16 may be positioned to expose either drum scale 36 or 37. For any position of the band selector switch, the window 15 exposes to view the corresponding band scale 3, 4, 5 or 6.

By this invention there is provided a composite indicator which makes the maximum use of the panel frontage by positioning the drum indicator directly behind the disk indicator. Additionally, when the range to be covered is divided into bands, particularly when the bands are of different width, the bands of the greatest extent are positioned outermost on the disk indicator to take greatest advantage of the space available on the disk surface.

Many modifications will now occur to those skilled in the art, for example, the disk indicator may be used as a fine indicator and the drum as a coarse indicator, also different drive ratios for the two drums will not be necessary in every case. In the example given if the drums 39 and 40 were driven at the same speed, the drum scales 36 and 37 could be provided with 8 and 16 successive scales, each extending from 0 to 100 kilocycles. The advantages of employing the gear step-up drive between the disk, however, is apparent.

Although this invention has been described with respect to a particular application as a frequency indicator and with respect to a specific embodiment thereof, this is not to be construed as a limitation. For a definition of the invention, reference is made to the appended claims.

I claim:

1. A composite indicator comprising an input driving shaft, a disk indicator bearing circumferentially extending scale divisions adjacent its periphery and mounted on an axial shaft extending transversely of said driving shaft, gear reduction means coupling said driving shaft to said disk indicator, said reduction means having a gear ratio of ten multiplied by two raised to an integer power, each scale on said disk indicator having a range that extends from the number two raised to an integer power to the number two raised to the next consecutive integer power, a drum indicator mounted coaxially on said driving shaft and bearing circumferentially extending scale divisions on its surface, each scale on said drum indicator ranging from 0 to 10 raised to an integer power, the surface of said drum being immediately adjacent the central portion of said disk, the central portion of said disk being transparent for presenting both sets of said scale divisions within the periphery of said disk.

2. An indicator comprising a circular disk bearing plural sets of circumferentially extending, radially spaced scales adjacent its periphery, said disk being rotatably mounted about the axis of said disk, a drum on one side of said disk rotatably mounted about the drum axis which extends transversely of the axis of said disk, said drum bearing plural sets of circumferentially extending, axially spaced scales on its surface each of which corresponds to one of said sets of scales on said disk, said surface being closely adjacent the central portion of said disk, the central portion of said disk being transparent, a slideably mounted shutter positioned on the other side of said disk and provided with a pair of spaced openings, said openings being spaced to expose to view portions of the corresponding scales from each of said sets, and driving means for rotation of said shafts in a predetermined ratio of movement.

3. In combination, a circular disk bearing first and second circumferentially extending coarse scales adjacent its periphery, said scales representing different ranges of magnitudes and said first scale representing the smaller range and being spaced radially inwardly from said second scale, said disk being mounted for rotation about an axial shaft, first and second rotatably mounted cylinders, a fine scale representing subdivision marks of the scale division marks of said first coarse scale extending circumferentially of said first cylinder, a repeated fine scale on said second cylinder extending circumferentially, each repetition of which represents subdivision marks of the scale division marks of said second coarse scale, an input shaft, said input shaft being drivingly connected to said axial shaft of said disk through first gear ratio reduction means, to said first cylinder directly, and to said second cylinder through gear ratio step-up means, the axis of said cylinders extending transversely of the axis of said disk, and shutter means having a pair of openings for exposing only the corresponding pair of fine and coarse scales at a time.

4. A composite indicator comprising a disk bearing first and second radially spaced coarse scales adjacent its periphery and having an axially extending shaft, a first drum bearing a fine scale on its surface and having an axial shaft, a second drum bearing a repeated fine scale on its surface and having an axial shaft, said drum shafts extending transversely of said disk shaft, one surface of said disk at the central portion thereof being spaced closely adjacent the aligned surfaces of said drums, the central portion of said disk being transparent, an input shaft drivingly connected through different predetermined gear ratios to each of said drum shafts and to said disk shaft.

5. An indicator including a rotatably supported transparent disk provided with an outer and inner set of coarse scales, said coarse scales extending circumferentially of said disk and being spaced radially inwardly from the disk periphery and representing succeedingly smaller ranges of magnitude, a driven shaft connected to said disk, a pair of rotatably mounted aligned drums defining an axis parallel to said disk and spaced with the drum surfaces closely adjacent the central portion of said transparent disk on one side thereof, the first of said drums corresponding to said inner set of coarse scales and provided on its surface with plural circumferentially extending, axially spaced, fine scales, each fine scale corresponding to one of said coarse scales in said inner set, the second of said drums corresponding to said outer set of coarse scales and provided on its surface with plural circumferentially extending, axially spaced, fine scales, each fine scale corresponding to one of said coarse scales in said outer set, a driving shaft connected to the first of said drums and through a gear ratio reduction to said driven shaft of said disk, a gear ratio step-up countershaft in driven connection with said driving shaft and connected to said second drum, and shutter means on the other side of said disk provided with spaced openings and being slideably mounted, the said shutter being movable to selected positions for exposing in said openings corresponding ones of said coarse and fine scales at a time.

References Cited in the file of this patent

UNITED STATES PATENTS

| | | |
|---|---|---|
| 2,067,871 | Booth | Jan. 12, 1937 |
| 2,127,109 | Engelhardt | Aug. 16, 1938 |
| 2,431,036 | Grisdale | Nov. 18, 1947 |